United States Patent [19]

Plaskura et al.

[11] Patent Number: 4,490,310
[45] Date of Patent: Dec. 25, 1984

[54] PROCESS FOR CONTACTING GAS AND LIQUID AS WELL AS PACKING FOR THE APPLICATION OF THIS PROCESS

[75] Inventors: Andrzej Plaskura; Ignacy Lachman; Tadeusz Byrka, all of Gliwice; Zbigniew Leszczyński, Warsaw; Krzysztof Rogalski, Warsaw; Marta Koch, Warsaw; Józef Zyczyński, Warsaw, all of Poland

[73] Assignee: Biuro Projektow i Realizacji Inwestycji Przemyslu Syntezy Chemicznej "Prosynchem", Gliwice, Poland

[21] Appl. No.: 399,919

[22] Filed: Jul. 19, 1982

[30] Foreign Application Priority Data

Jul. 29, 1981 [PL] Poland ............................. 232397

[51] Int. Cl.³ .................................. B01F 3/04
[52] U.S. Cl. .................................. 261/79 A; 55/237; 202/158; 210/150; 261/94; 261/DIG. 72; 422/310
[58] Field of Search ..................... 261/94–98, 261/79 A, 112, 118, DIG. 54, DIG. 72; 55/90, 237; 210/150, 151; 422/310; 202/158

[56] References Cited

U.S. PATENT DOCUMENTS

| 1,365,671 | 1/1921 | Fairlie | 261/DIG. 72 |
| 1,715,252 | 5/1929 | Sperr, Jr. | 261/DIG. 72 |
| 3,491,892 | 1/1970 | McCann | 261/112 X |
| 3,884,654 | 5/1975 | De Crevoisier et al. | 261/112 X |
| 4,014,962 | 3/1977 | Del Notario | 261/DIG. 72 |
| 4,171,335 | 10/1979 | Planovsky et al. | 261/79 A X |
| 4,202,847 | 5/1980 | Ernst et al. | 261/112 X |
| 4,257,784 | 3/1981 | Gebhard et al. | 261/112 X |
| 4,277,425 | 7/1981 | Leva | 261/DIG. 72 |
| 4,290,980 | 9/1981 | Pikon et al. | 422/310 X |

FOREIGN PATENT DOCUMENTS 74693 5/1977 Poland ...................... 261/DIG. 72

Primary Examiner—Richard L. Chiesa
Attorney, Agent, or Firm—Murray Schaffer

[57] ABSTRACT

A packed counter-current column in which the gas and the liquid is contacted in a column packed with layers of reproducible elements of regular polygonal section, each of which has a lower part shaped to form a nozzle by overlapping of two opposite walls of the element, which walls also form slits between themselves and the other walls, and an upper part including an arcuate or angular bend which narrows the upper part of the element. The layers may be spaced apart by from 0 to 3 times the height of a layer and superimposed or rotated in a horizontal plane relative to each other by an optional angle. The configuration introduces to the normal counter-current flow an additional conflow vortex and cross-flow motion in the elements and a turbulent motion between the layers.

4 Claims, 2 Drawing Figures

PROCESS FOR CONTACTING GAS AND LIQUID AS WELL AS PACKING FOR THE APPLICATION OF THIS PROCESS

BACKGROUND OF THE INVENTION

The present invention relates to a process for contacting gas and liquid, as applied in processes of mass and heat exchange and in particular in such operations, for the distillation, rectification, extraction, absorption, desorption, drying and humidification of gas, as well as for its dedusting.

The invention relates also to the packing employed in such processes, which packing constitutes a substantial part of the columns.

Processes of mass and heat exchange, consisting in the formation of gas and liquid streams in columns provided with packing, run as a general rule in counter-current motion.

In this known and presently used method of a diaphragmic mass and heat exchange, the exchange is carried out by the contact of gas with a film of the liquid in counter-current motion. Liquid flows down the walls of the column and along the surface of the packing device, contacting the gas which flows upwardly. The contact of phases takes place on the surface of the film of the liquid, the contact time being, on account of the counter-current motion, very short. The duration of the contact time of the phases, as well as the interfacial surface are in this situation dependent upon the configuration of the surface of the packing elements.

Excessive enlargement of this surface is however limited by the increase of the resistance of flow.

The packings used until now are based on the principle of maximum development of the surface in order to obtain intensive mass and heat exchange. For industrial purposes the following are used standard packings: Raschig rings, Berl saddles or Intalox, improved standard packings, such as rings with a cut-out Bialecki, Pall, perforated rings, Cannon and especially shaped pieces Interpax, Stadman, Sulzer.

The most compact structures show packings made of horizontal and vertical sheet packs or tubes, characterized by a uniform contact of liquid and gas phases, in cross-section where the packings are vertical or horizontal sheets, the liquid flows down in a thin layer and the contact of phases takes place on its surface. In one variation chequerwork packings are used, their operation being similar to that of sieve plates. They are made of perforated sheets bent and put together in a way to form channels of a square section. Liquid flows down the walls, mixing with the gas stream.

There is also known a cell packing in the shape of a lattice, forming cells in square section. The cells are bent in their lower part to form a slit through which gas flows in which the cells break the liquid stream, thus increasing the contact surface.

All of the solutions applied until now show a number of imperfections and inconveniences.

Thus, the standard packing has a low elasticity resulting from the possibility of flooding caused by the lack of an overall surface sprinkling and by the so called "channeling" effect. Improved standard packings enable increase loadings, but show a two-fold or a three-fold increase in resistance to flow in comparison with standard packings, and because of their more complicated shape they are more difficult to make.

Pack packings, in comparison to standard packings, enable increase loadings, improve the contact of phases, obtain higher rates and reduce the resistance of flow. Because shapes are, however, more complicated, they are much more difficult to make.

The construction of cell packings with elements open at the top and with a slit in their lower part is simple, creating the possibility of obtaining, in industrial application gas velocities up to 5 m/Sec. calculated upon an empty section, at low resistances of flow.

This packing permits, however, agitation of the gas stream only inside the cell and breaks the liquid stream. Excessive loadings of gas and liquid force the liquid out of the cells or cause the floating of a foam layer over the packing, leading thus to the reduction of the contact time between the streams.

The object of the present invention is to extend the contact time of gas and liquid and to increase simultaneously the interfacial surface without the necessity of overdeveloping the packing surface.

SUMMARY OF THE INVENTION

The process, according to the invention, for contacting gas and liquid in a packed counter-current column, comprises contacting the gas and liquid in a column packed with layers of elements the nature of which is such that in addition to the counter-current contact in packing elements and in spaces between packing layers, the gas and liquid are brought into contact within the elements in a concurrent flowing vortex motion and in cross-flow motion introduced due to the configuration of the walls of the packing elements and between the packing layers in a turbulent motion, produced by the configuration and the location of the inlets and the outlets of the packing elements with reference to each other.

As a result of the conflow motion being applied at a simultaneous whirl of the streams inside of the packing elements the contact time of the phases is extended and the mass and heat exchange between the streams increased. The vortex of the gas and liquid stream improves the heat and mass exchange, acting at the same time to prevent settling of impurities on the walls of the packing.

The packing for contacting gas and liquid according to the invention consists of layers composed of reproducible elements having a regular polygon section each of which has a lower part shaped in the form of a nozzle, made by two overlapping opposite walls of the element. These walls form at the same time slits with the rest of the walls.

The nozzle is placed so as to direct the gas stream upon a vertical wall of the element. This wall has in its upper part a radial or an angular bend, constituting simultaneously a narrowing of the element section which increases the vortex motion of the liquid and gas stream.

Reproducible elements of the packing are set in layers, the location of neighbouring layers in horizontal planes being optional, as the construction of the inlet and of the outlet secures in any location the contact of gas and of liquid between layers in turbulent motion. The perpendicular distances between successive packing layers amount, depending on the parameters of the gas and liquid stream flow, from 0 to 3 times the height of the packing layer. For optimum work conditions of the packing this distance should preferably be amounts most from 0 to the height of one layer.

The process for contacting liquid and gas, according to the invention, as well as the packing for the application of this process, enable the work of the column at higher velocities of gas and liquid stream flow of up to 20 Kg/m² at a stable operation of the apparatus.

Gas flow rates are on the average 5 times higher than those in the standard packing (Raschig rings) at the same flow resistances calculated for 1 m of the packing layer.

The application of the process and of the packing according to the invention enables an increase in the heat and mass exchange factors by 100 p.c. on the average in comparison with a cell packing of equal height and at equal liquid and gas flows. These results enable considerable reduction in the overall size of the apparatus, as well as its production costs.

The process for contacting gas and liquid according to the invention, as well as the packing for the application of this process will now be further described by way of example with reference to the accompanying drawings.

In a vertical column with a diameter 200 m. have been set five layers of packing elements, the dimensions of each element being 20×20×40 mm. In successive layers the elements were turned in relation to each other in horizontal planes at an optional angle. The nozzle slit in the elements was equal and amounted in the smallest section to 3 mm. Air heated in an electric heater was delivered into the column by a fan. Water was pumped into the column by a fan. A sprinkler located above the packing provided a uniform distribution of the liquid across the cross-section of the column. Above the sprinkler was placed a gas drop separator. The temperatures of air and of water was measured by thermocouples Fe-Ko (Ko is constantan). The static pressure drop of gas at the flow through the packing was measured with a differential water manometer.

The humidity of air flowing in and out of the column was determined on the basis of indications by a "wet-bulb thermometer."

The mass rate of air flow was changed during the tests from 1.30 to 3.46 kg/m².s. Stable operation of the column was obtained at the density of water sprinkling within the bounds from 18 050 to 122 680 W/m³ deg.

Comparative tests with the cell packing made under the same working conditions proved that the heat penetration factors in the solution according to the invention was at 120 p.c. higher than those in the cell packing.

Figure 1:
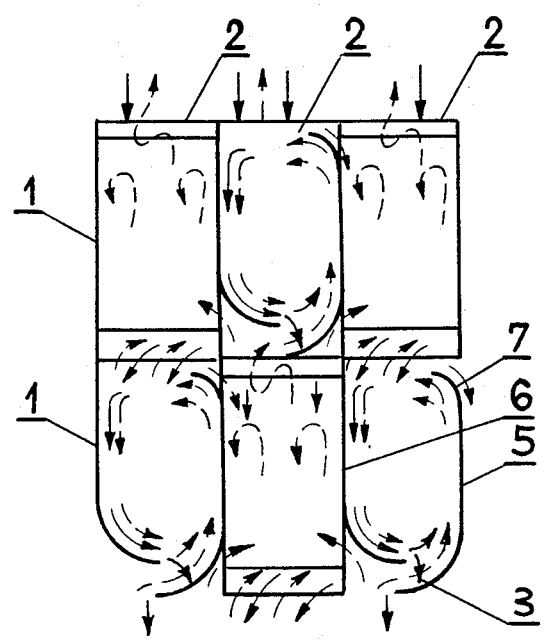
FIG. 1 is a schematic diagram of flow paths in the elements of the invention.
Figure 2:
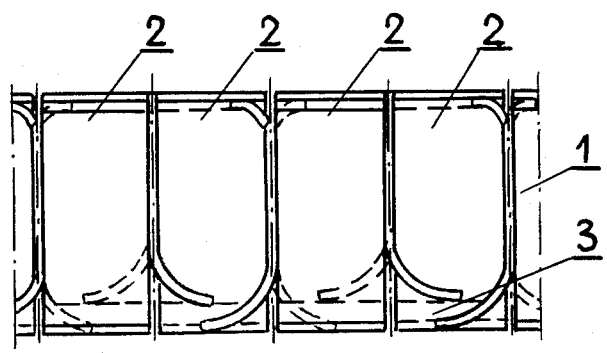
FIG. 2 is a cross-sectional view of packing elements of the invention.

The solution according to the invention is shown on the drawing, wherein FIG. 1 is presented a functional diagram of the elements in two packing layers and in FIG. 2 is shown the packing layer in cross-section.

The packing consists of layers 1 composed of reproducible elements with regular polygon section. The elements are shaped in their lower part in the form of a nozzle 3 formed by two overlapping opposite walls 5 and 6 of the element 2.

These walls make at the same time slits with the rest of the walls. The nozzle 3 is placed so as to direct the gas stream upon the vertical wall 5 of the element 2, which has in its upper part a radial bend 7.

The motions of the gas and liquid streams are shown in FIG. 1, the gas streams being marked by a broken line and the liquid streams by a full line.

Gas flows into the element from below through the nozzle, which brings about an increase in its velocity. Liquid is directed into the element from above in counter-current to the gas.

The gas stream flowing out from the nozzle entrains liquid flowing down and recycles a part of it, setting it in a vortex conflow. A further whirling motion takes place as a result of the bend of the wall in its upper part, where entrainment by the whirling stream of the liquid flowing in from above also occurs.

The vortex conflow of the liquid and gas streams taking place inside of the elements, extends the contact time of the phases and increases the rate of heat and mass exchange, eliminating moreover the possibility of formation of "dead" spaces, preventing thus the settling of impurities in the packing.

A part of the gas stream escapes from the element through the narrowing in its upper part, and is set in the turbulent motion within the space between the layers by the location of the inlets and the outlets of the packing elements in reference to each other.

Simultaneously gas mixes with the liquid flowing down, thus increasing additionally the contact surface of the phases. The slits in the lower part of the elements, formed between the nozzle and the neighboring walls, direct a part of the gas stream to the elements crosswise in relation to the direction of the streams flowing out of the nozzles. This increases also the contact rate of the phases.

We claim:

1. A packing for contacting gas and liquid in a counter-current column comprising layers composed of reproducible elements of regular polygonal section, each of which has a lower part shaped to form a nozzle by overlapping of two opposite walls of the element, which walls form at the same time slits between themselves and the other walls, and wherein the nozzle is placed so as to direct the gas upon a vertical wall of the element, which wall has in an upper part an arcuate or angular bend which increases the speed of said gas and liquid creating a vertical vortex motion in which the liquid and gas flows in the same direction and forms a narrowing of the element in the upper part.

2. The packing according to claim 1 wherein the perpendicular distance between the packing layers is from 0 to 3 times the height of a packing layer.

3. Packing according to claim 2 wherein the perpendicular distance between the packing layers is from 0 to 1 times the height of a packing layer.

4. Packing according to any one of claims 1, 2 or 3 wherein the elements in successive layers are turned in a horizontal plane by a selected angle in relation to the last adjacent layer.

* * * * *